US012641580B2

(12) United States Patent
Abdelghaffar et al.

(10) Patent No.: US 12,641,580 B2
(45) Date of Patent: May 26, 2026

(54) RESOURCE ALLOCATION SCALING FOR SUB-BAND FULL DUPLEX COMMUNICATIONS

(71) Applicant: QUALCOMM Incorporated, San Diego, CA (US)

(72) Inventors: Muhammad Sayed Khairy Abdelghaffar, San Jose, CA (US); Gokul Sridharan, Sunnyvale, CA (US); Hung Dinh Ly, San Diego, CA (US); Ahmed Attia Abotabl, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 18/046,620

(22) Filed: Oct. 14, 2022

(65) Prior Publication Data

US 2024/0129902 A1 Apr. 18, 2024

(51) Int. Cl.
*H04W 72/0446* (2023.01)
*H04L 5/14* (2006.01)
(52) U.S. Cl.
CPC ........... *H04W 72/0446* (2013.01); *H04L 5/14* (2013.01)
(58) Field of Classification Search
CPC .................... H04W 72/0446; H04W 72/0453; H04L 5/14; H04L 5/001; H04L 5/0092; H04L 5/0094
See application file for complete search history.

(56) References Cited

U.S. PATENT DOCUMENTS

| | | | | |
|---|---|---|---|---|
| 2016/0100382 A1* | 4/2016 | He | ........................ | H04L 5/001 |
| | | | | 370/329 |
| 2021/0352667 A1* | 11/2021 | Abotabl | ............ | H04W 72/0446 |
| 2021/0377938 A1* | 12/2021 | Huang | .............. | H04W 72/1263 |
| 2023/0163937 A1* | 5/2023 | Awadin | ..................... | H04L 5/14 |
| | | | | 370/329 |

(Continued)

FOREIGN PATENT DOCUMENTS

| | | | | |
|---|---|---|---|---|
| CA | 3066293 A1 * | 12/2018 | ............ | H04W 80/02 |
| CA | 3031032 C * | 2/2021 | ............ | H04W 72/53 |

(Continued)

OTHER PUBLICATIONS

International Search Report and Written Opinion—PCT/US2023/074358—ISA/EPO—Jan. 8, 2024.

(Continued)

*Primary Examiner* — Habte Mered
(74) *Attorney, Agent, or Firm* — Harrity & Harrity, LLP

(57) ABSTRACT

Various aspects of the present disclosure generally relate to wireless communication. In some aspects, a user equipment may receive a communication indicating, via a resource indicator value (MV) or a bitmap, a frequency domain resource allocation (FDRA) for at least one slot. The UE may identify, using the MV or the bitmap, one or more first allocated resource block groups (RBGs) of a first slot of the at least one slot, wherein a size of each RBG of the one or more first allocated RBGs is based at least in part on whether the first slot is a sub-band full duplex (SBFD) slot. Numerous other aspects are provided.

30 Claims, 15 Drawing Sheets

1000 ⟶

1010 ⟶ Receive a communication indicating, via a resource indicator value (RIV) or a bitfield, a frequency domain resource allocation (FDRA) for at least one slot 1020 ⟶ Identify, using the RIV or the bitfield, one or more first allocated resource block groups (RBGs) of a first slot of the at least one slot, wherein a size of each RBG of the one or more first allocated RBGs is based at least in part on whether the first slot is a sub-band full duplex (SBFD) slot

(56) References Cited

U.S. PATENT DOCUMENTS

| | | | | |
|---|---|---|---|---|
| 2023/0239122 A1* | 7/2023 | Xiong | H04B 1/7143 | |
| | | | 370/280 | |
| 2023/0276438 A1* | 8/2023 | Rudolf | H04W 52/146 | |
| 2024/0039655 A1* | 2/2024 | Rudolf | H04L 5/14 | |
| 2024/0097866 A1* | 3/2024 | Nemeth | H04L 5/1469 | |
| 2024/0107525 A1* | 3/2024 | Khan Beigi | H04L 5/1469 | |
| 2024/0107541 A1* | 3/2024 | Mahama | H04L 5/0051 | |
| 2024/0114374 A1* | 4/2024 | Chege | H04W 24/10 | |
| 2024/0380563 A1* | 11/2024 | Shim | H04L 5/0094 | |

FOREIGN PATENT DOCUMENTS

| | | | | | |
|---|---|---|---|---|---|
| WO | WO-2024032334 A1 * | 2/2024 | | H04L 5/001 | |
| WO | WO-2024072179 A1 * | 4/2024 | | H04L 5/14 | |

OTHER PUBLICATIONS

Mediatek Inc: "Discussion on Subband Non-Overlapping Full Duplex for NR", R1-2209770, 3GPP TSG RAN WG1 Meeting #110bis-e, 3rd Generation Partnership Project Mobile Competence Centre, 650, Route Des Lucioles, F-06921 Sophia-Antipolis Cedex, France vol. RAN WG1, No. e-Meeting, Oct. 10, 2022-Oct. 19, 2022, Sep. 30, 2022, XP052259243, 18 Pages, Section 2.2.2 Section 2.2.2 (text below Figure 3) Figure 3.

* cited by examiner

FIG. 6

930
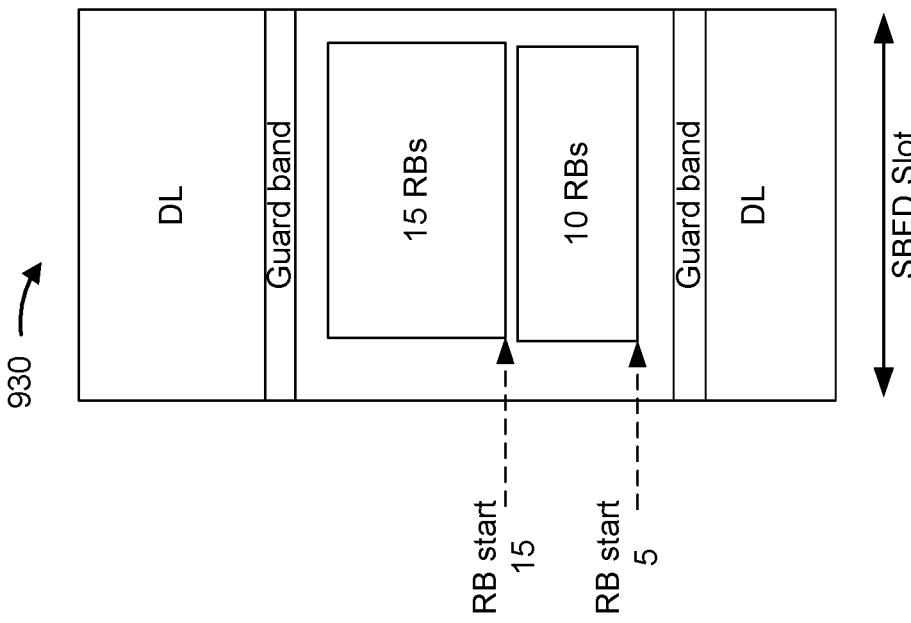
925
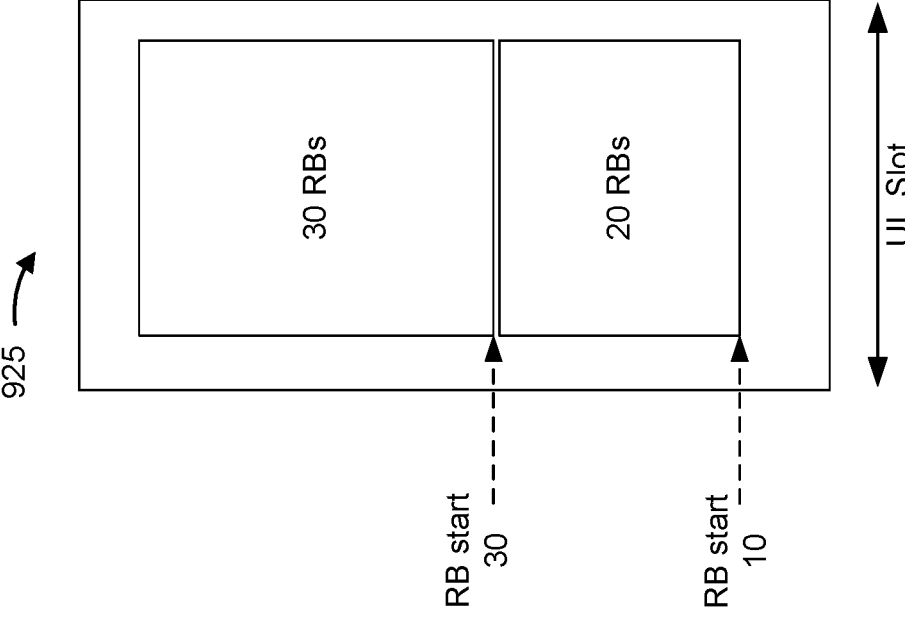
FIG. 9C

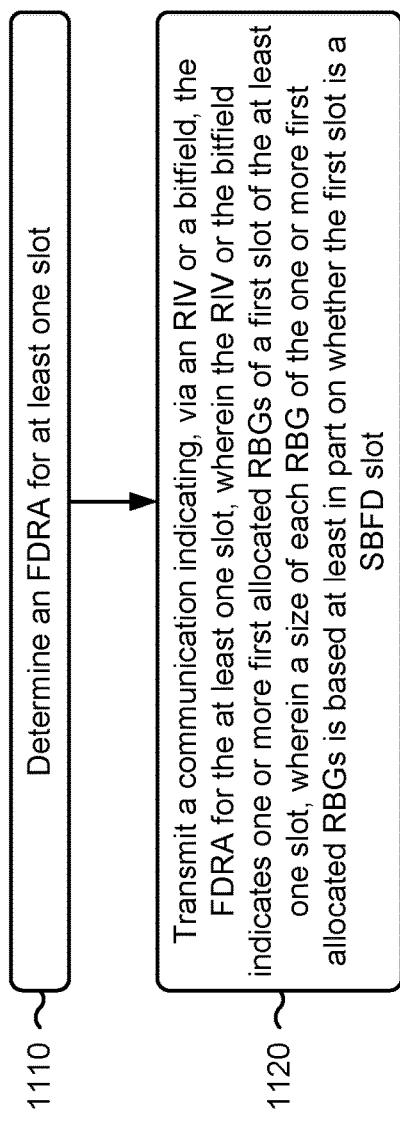

Determine an FDRA for at least one slot

1110

Transmit a communication indicating, via an RIV or a bitfield, the FDRA for the at least one slot, wherein the RIV or the bitfield indicates one or more first allocated RBGs of a first slot of the at least one slot, wherein a size of each RBG of the one or more first allocated RBGs is based at least in part on whether the first slot is a SBFD slot

RESOURCE ALLOCATION SCALING FOR SUB-BAND FULL DUPLEX COMMUNICATIONS

FIELD OF THE DISCLOSURE

Aspects of the present disclosure generally relate to wireless communication and to techniques and apparatuses for resource allocation scaling for sub-band full duplex (SBFD) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving a communication indicating, via a resource indicator value (MV) or a bitmap, a frequency domain resource allocation (FDRA) for at least one slot. The method may include identifying, using the RIV or the bitmap, one or more first allocated resource block groups (RBGs) of a first slot of the at least one slot, wherein a size of each RBG of the one or more first allocated RBGs is based at least in part on whether the first slot is a sub-band full duplex (SBFD) slot.

Some aspects described herein relate to a method of wireless communication performed by an apparatus of a first network node. The method may include determining an FDRA for at least one slot. The method may include transmitting a communication indicating, via an MV or a bitmap, the FDRA for the at least one slot. The RIV or the bitmap may indicate one or more first allocated RBGs of a first slot of the at least one slot, and a size of each RBG of the one or more first allocated RBGs may be based at least in part on whether the first slot is an SBFD slot.

Some aspects described herein relate to a UE for wireless communication. The UE may include a memory and one or more processors coupled to the memory. The one or more processors may be configured to receive a communication indicating, via an RIV or a bitmap, an FDRA for at least one slot. The one or more processors may be configured to identify, using the MV or the bitmap, one or more first allocated RBGs of a first slot of the at least one slot, wherein a size of each RBG of the one or more first allocated RBGs is based at least in part on whether the first slot is an SBFD slot.

Some aspects described herein relate to a network node for wireless communication. The network node may include a memory and one or more processors coupled to the memory. The one or more processors may be configured to determine an FDRA for at least one slot. The one or more processors may be configured to transmit a communication indicating, via an RIV or a bitmap, the FDRA for the at least one slot. The RIV or the bitmap may indicate one or more first allocated RBGs of a first slot of the at least one slot, and a size of each RBG of the one or more first allocated RBGs may be based at least in part on whether the first slot is an SBFD slot.

Some aspects described herein relate to a non-transitory computer-readable medium that stores a set of instructions for wireless communication by a UE. The set of instructions, when executed by one or more processors of the UE, may cause the UE to receive a communication indicating, via an RIV or a bitmap, an FDRA for at least one slot. The set of instructions, when executed by one or more processors of the UE, may cause the network node to identify, using the RIV or the bitmap, one or more first allocated RBGs of a first slot of the at least one slot, wherein a size of each RBG of the one or more first allocated RBGs is based at least in part on whether the first slot is an SBFD slot.

Some aspects described herein relate to a non-transitory computer-readable medium that stores a set of instructions for wireless communication by a network node. The set of instructions, when executed by one or more processors of the network node, may cause the network node to determine an FDRA for at least one slot. The set of instructions, when executed by one or more processors of the network node, may cause the network node to transmit a communication indicating, via an RIV or a bitmap, the FDRA for the at least one slot. The RIV or the bitmap may indicate one or more first allocated RBGs of a first slot of the at least one slot, and a size of each RBG of the one or more first allocated RBGs may be based at least in part on whether the first slot is an SBFD slot.

Some aspects described herein relate to an apparatus for wireless communication. The apparatus may include means for receiving a communication indicating, via an RIV or a bitmap, an FDRA for at least one slot. The apparatus may include means for identifying, using the RIV or the bitmap, one or more first allocated RBGs of a first slot of the at least one slot, wherein a size of each RBG of the one or more first allocated RBGs is based at least in part on whether the first slot is an SBFD slot.

Some aspects described herein relate to an apparatus for wireless communication. The apparatus may include means for determining an FDRA for at least one slot. The apparatus may include means for transmitting a communication indicating, via an RIV or a bitmap, the FDRA for the at least one slot. The RIV or the bitmap may indicate one or more first allocated RBGs of a first slot of the at least one slot, and a size of each RBG of the one or more first allocated RBGs may be based at least in part on whether the first slot is an SBFD slot.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of uplink frequency domain resource allocation (FDRA), in accordance with the present disclosure.

FIGS. 9A-9C are diagrams illustrating examples associated with FDRA for different slot types.

FIGS. 10 and 11 are diagrams illustrating example processes associated with resource allocation scaling for SBFD communications, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
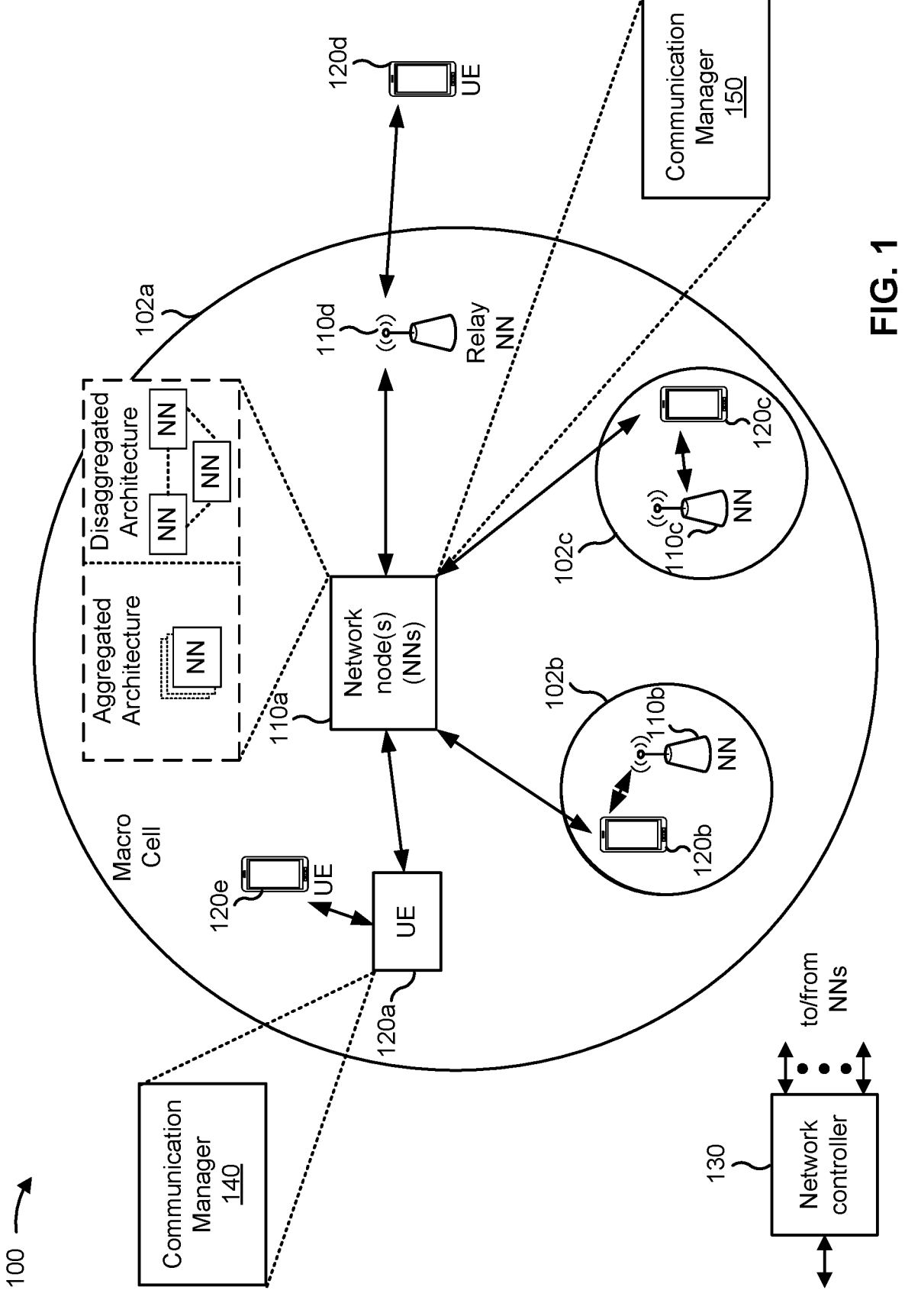
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-*a* or FR4-1, and/or FR5, or may be within the EHF band. It is contemplated that the frequencies included in these operating bands (e.g., FR1, FR2, FR3, FR4, FR4-*a*, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a communication indicating, via an RIV or a bitmap, an FDRA for at least one slot; and identify, using the RIV or the bitmap, one or more first allocated RBGs of a first slot of the at least one slot, wherein a size of each RBG of the one or more first allocated RBGs is based at least in part on whether the first slot is an SBFD slot. Additionally, or alternatively, the communication manager 140 may perform one or more other operations described herein.

In some aspects, the network node 110 may include a communication manager 150. As described in more detail elsewhere herein, the communication manager 150 may determine an FDRA for at least one slot; and transmit a communication indicating, via an RIV or a bitmap, the FDRA for the at least one slot, wherein the RIV or the bitmap indicates one or more first allocated RBGs of a first slot of the at least one slot, wherein a size of each RBG of the one or more first allocated RBGs is based at least in part on whether the first slot is an SBFD slot. Additionally, or alternatively, the communication manager 150 may perform one or more other operations described herein.

As indicated above, FIG. 1 is provided as an example. Other examples may differ from what is described with regard to FIG. 1.

Figure 2:
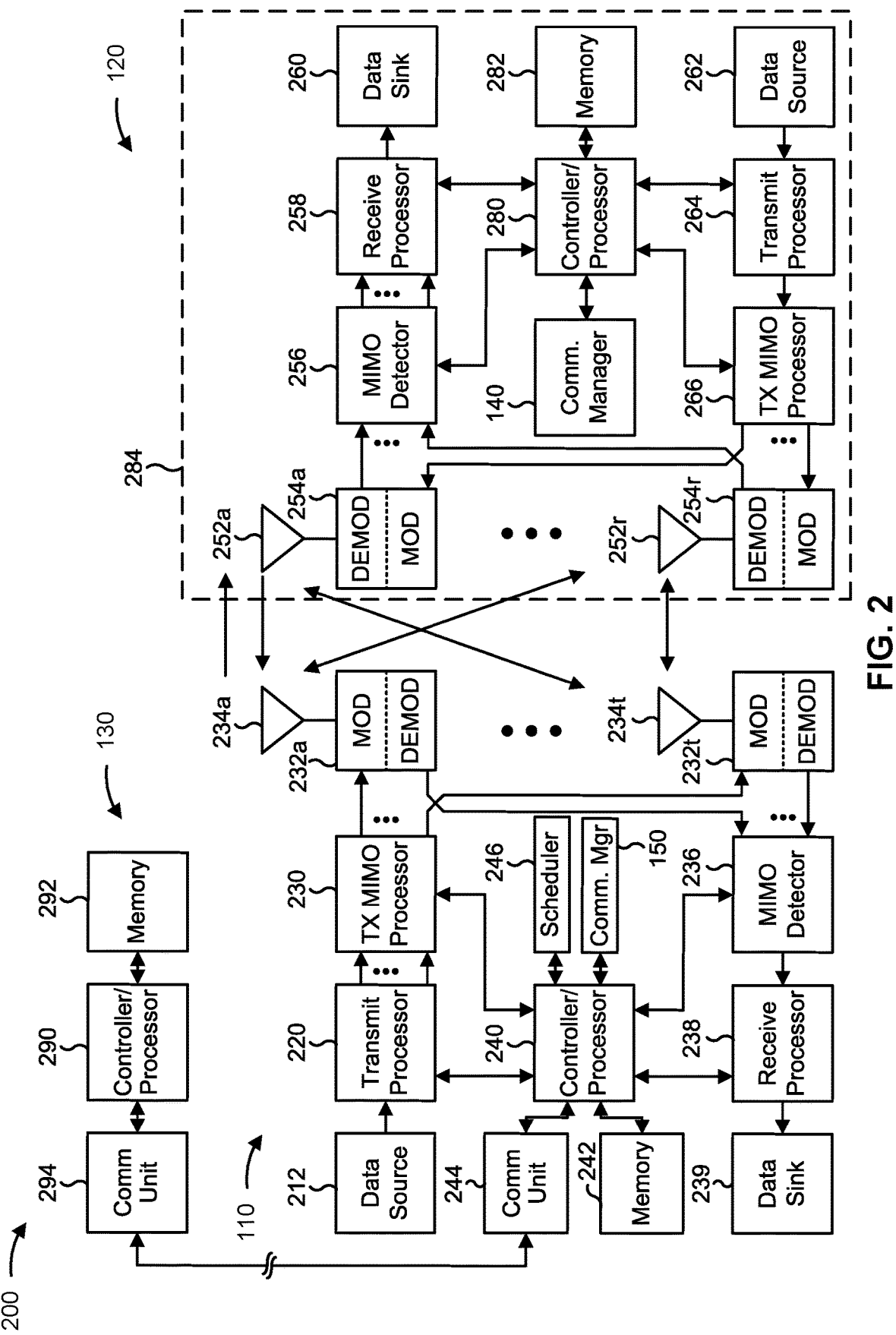
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the network node 110, the controller/processor 280 of the UE 120, and/or any other component(s) of FIG. 2 may perform one or more techniques associated with resource allocation scaling for SBFD communications, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving a communication indicating, via an RIV or a bitmap, an FDRA for at least one slot; and/or means for identifying, using the RIV or the bitmap, one or more first allocated RBGs of a first slot of the at least one slot, wherein a size of each RBG of the one or more first allocated RBGs is based at least in part on whether the first slot is an SBFD slot. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for determining an FDRA for at least one slot; and means for transmitting a communication indicating, via an RIV or a bitmap, the FDRA for the at least one slot, wherein the MV or the bitmap indicates one or more first allocated RBGs of a first slot of the at least one slot, wherein a size of each RBG of the one or more first allocated RBGs is based at least in part on whether the first slot is an SBFD slot. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
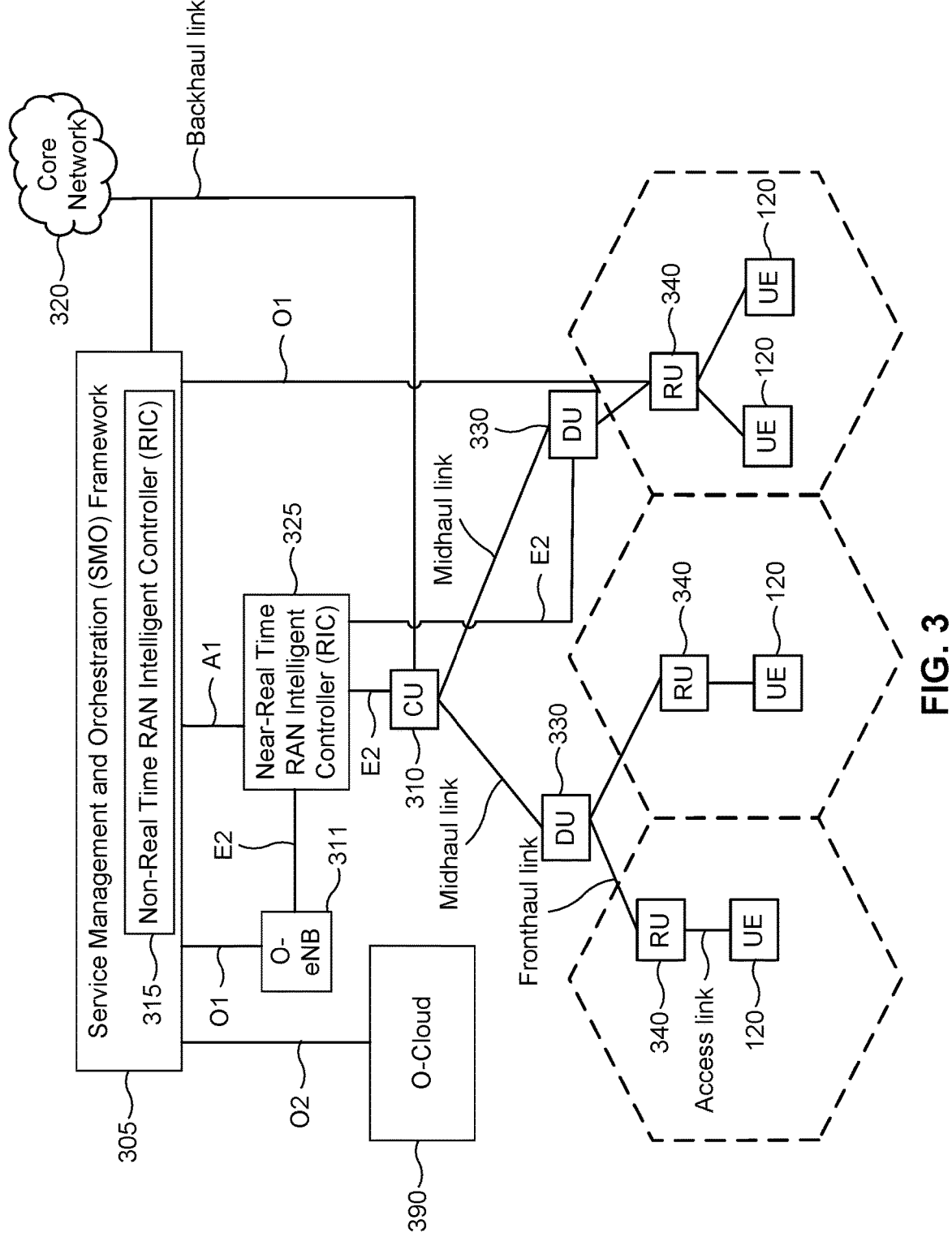
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
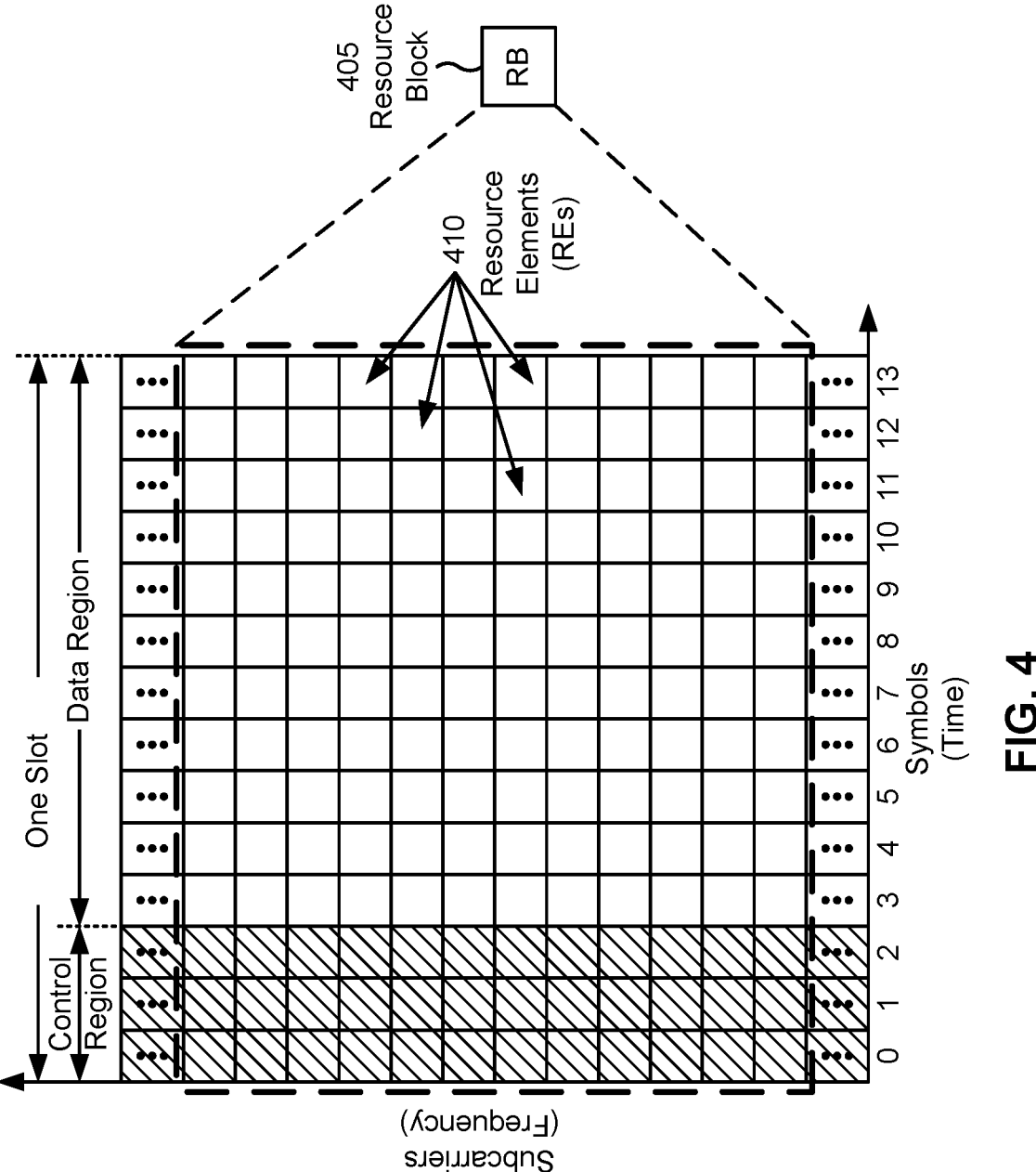
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a network node 110 as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value. In some aspects, RBs may be bundled together to form resource block groups (RBGs). For example, and as described further herein, an RBG may include multiple RBs, such as 2, 4, 8, or 16 RBs, which are allocated for wireless communication.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 4 is provided as an example. Other examples may differ from what is described with respect to FIG. 4.

Figure 5:
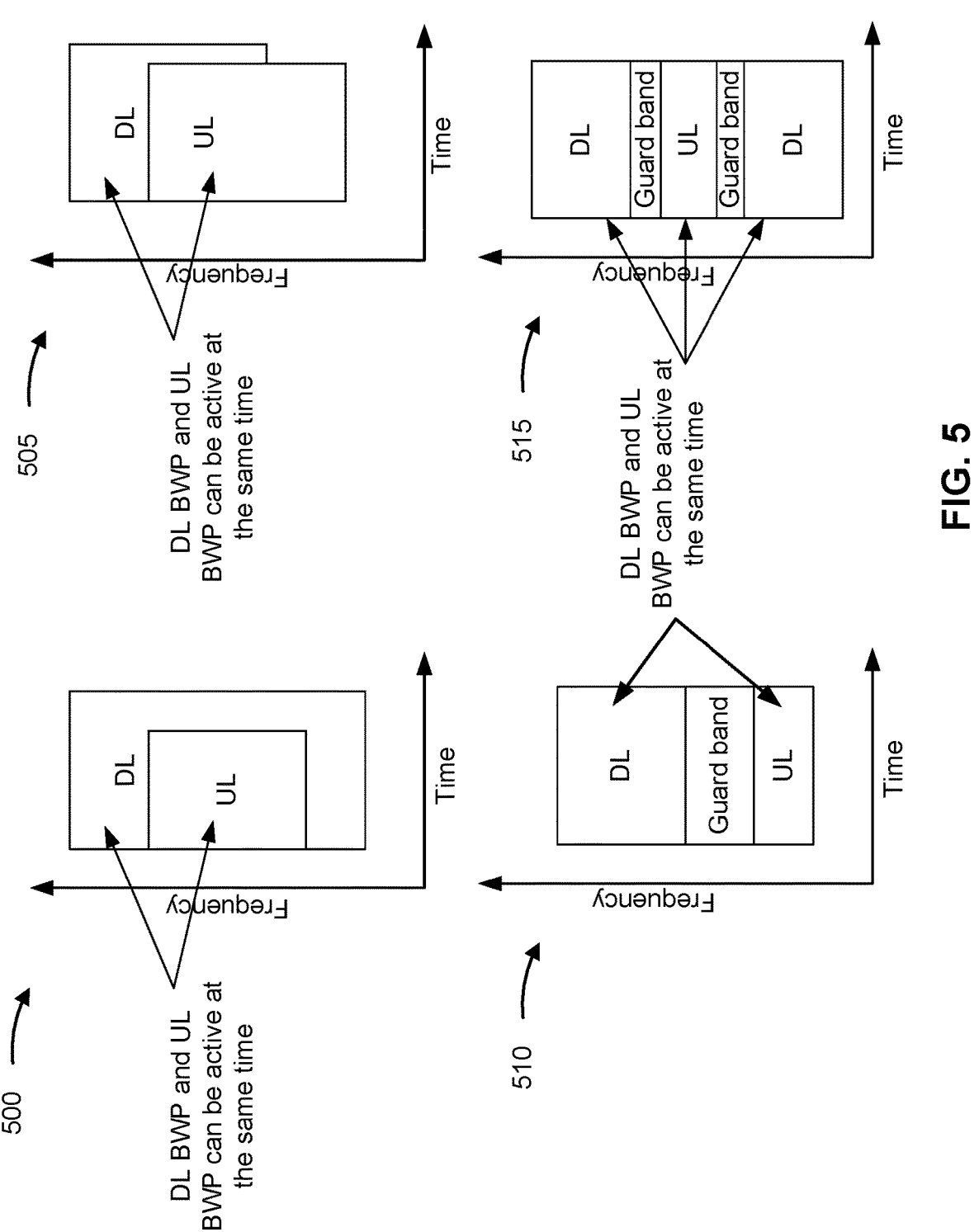
FIG. 5 is a diagram illustrating examples of full-duplex communication in a wireless network, in accordance with the present disclosure.

FIG. 5 is a diagram illustrating examples 500, 505, 510, and 515 of full-duplex communication in a wireless network, in accordance with the present disclosure. "Full-duplex communication" in a wireless network refers to simultaneous bi-directional communication between devices in the wireless network. For example, a UE or network node operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol). Half-duplex communication may be performed, for example, using frequency division duplexing (FDD) and/or time-division duplexing (TDD). In FDD mode, for example, a UE may use a first frequency region (or channel) for uplink communication and a second frequency region (or channel) for downlink communication at the same time (e.g., in a same frame, slot, and/or symbol). In TDD mode, a UE may transmit uplink communications and receive downlink communications in a single frequency region, but at different time intervals (e.g., frames, slots, and/or symbols).

As shown in FIG. 5, examples 500 and 505 show examples of in-band full-duplex (IBFD) communication. In IBFD, a UE may transmit an uplink communication to a base station and receive a downlink communication from the base station on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, examples 510 and 515 show examples of sub-band full-duplex (SBFD) communications, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by one or more guard bands.

As indicated above, FIG. 5 is provided as an example. Other examples may differ from what is described with respect to FIG. 5.

Figure 6:
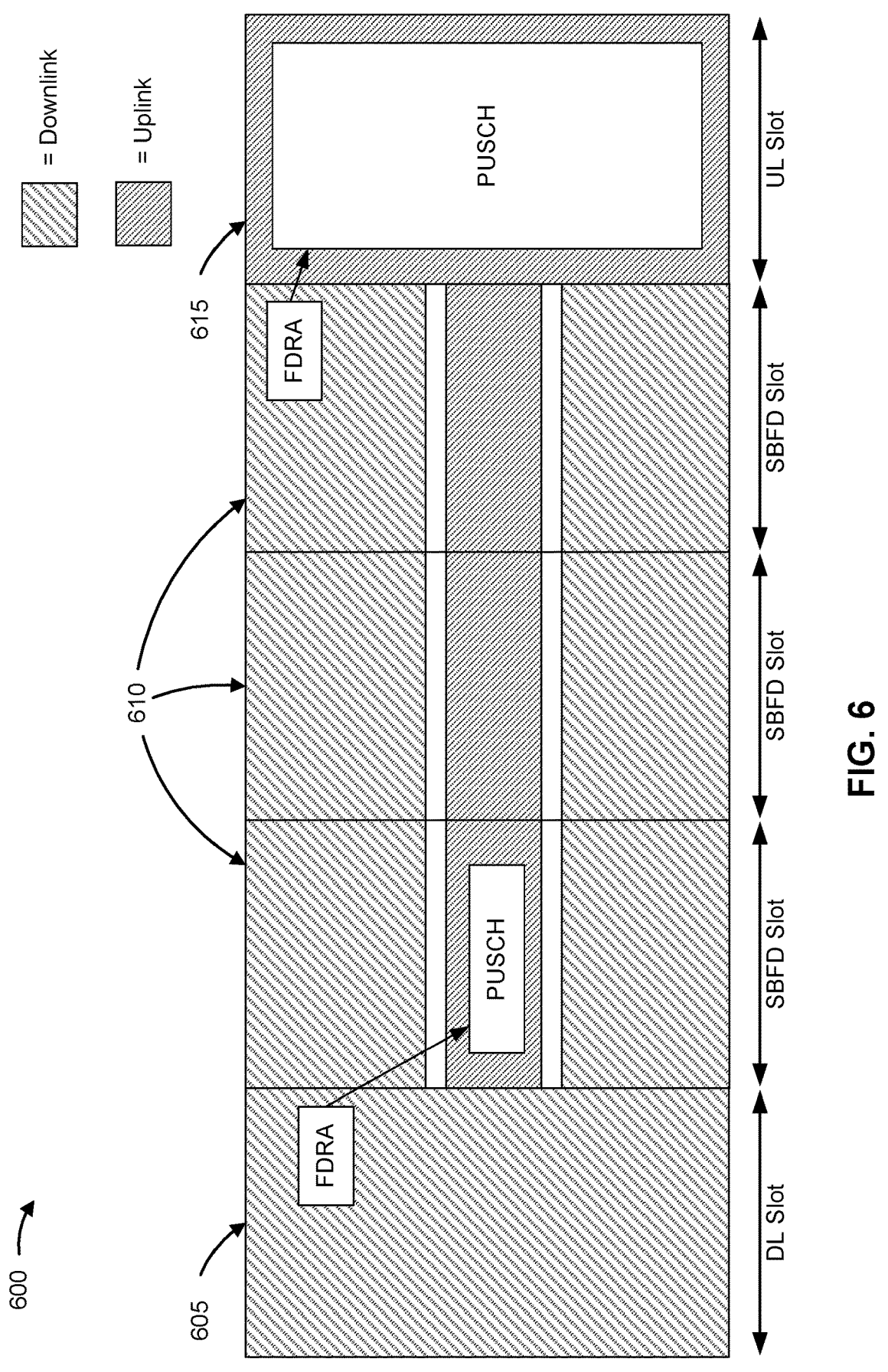

FIG. 6 is a diagram illustrating an example 600 of uplink frequency domain resource allocation (FDRA), in accordance with the present disclosure. The aspects described herein may also apply for downlink frequency domain resource allocation. The example 600 includes a depiction of three different types of slots: a downlink slot 605, three SBFD slots 610, and an uplink slot 615. In some aspects, an FDRA may be indicated via a control resource set downlink control information (DCI) or a higher layer configuration (e.g., RRC). In this example 600, the FDRA is indicated via DCI. For example, the downlink slot 605 may include DCI granting uplink transmission and indicating an FDRA for the transmission in the uplink sub-band of each of the SBFD slots 610, and the last SBFD slot 610 may include DCI indicating an FDRA for a PUSCH transmission in the full uplink bandwidth part (BWP) of the uplink slot.

In some aspects, the FDRA may be associated with a resource allocation type, and the manner in which the FDRA is indicated may depend on the resource allocation type. For example, using Type 0 resource allocation, consecutive RBs may be bundled into RBGs, and resources may be allocated in multiples of the RBGs. The sizes of the RBGs may depend on a size of the BWP of the slot in which the resources are allocated. For example, each RBG may include 2, 4, 8, or 16 RBs. In one example Type 0 configuration, a BWP size of 1-36 RBs may result in 2 RBs per RBG, a BWP size of 37-72 RBs may result in 4 RBs per RBG, a BWP size of 73-144 RBs may result in 8 RBs per RBG, and a BWP size of 145-275 RBs may result in 16 RBs per RBG. The Type 0 configuration may be configured, for example, via radio resource control (RRC). In some aspects, the RBGs that are allocated via the FDRA may be indicated in a bitmap that maps to the RBGs of a slot. For example, an 18-bit bitmap of "000011111111100000" may indicate that the 5th-13th RBGs are to be allocated.

For Type 1 resource allocation, one or more consecutive RBs are allocated based on an RB start parameter and a number of consecutive RBs within the BWP. For example, a resource indicator value (MV) may be included in DCI, and the RIV may indicate the RB starting point and the number of consecutive RBs. In some examples, the consecutive RBs may be considered an RBG and the MV may include the starting RGB and number of RGBs. By way of example, an MV may be calculated using the following formula:

$$\text{if } (L_{RBs} - 1) \le \lfloor N_{BWP}^{size}/2 \rfloor \text{ then } RIV = N_{BWP}^{size}(L_{RBs} - 1) + RB_{start}$$

$$\text{else } RIV = N_{BWP}^{size}\left(N_{BWP}^{size} - L_{RBs} + 1\right) + \left(N_{BWP}^{size} - 1 - RB_{start}\right)$$

$L_{RBs}$ may indicate a number of RBs to be allocated.

$$N_{BWP}^{size}$$

may indicate a size of the BWP (e.g., in total RBs).

$RB_{start}$ may indicate the position at which the consecutive RB allocation begins.

Based on the above formula, the MV may be calculated (e.g., by a network node), such that a UE may determine, from the RIV, which resources to use for transmission/reception of one or more communications.

As indicated above, FIG. 6 is provided as an example. Other examples may differ from what is described with respect to FIG. 6.

Figure 7:
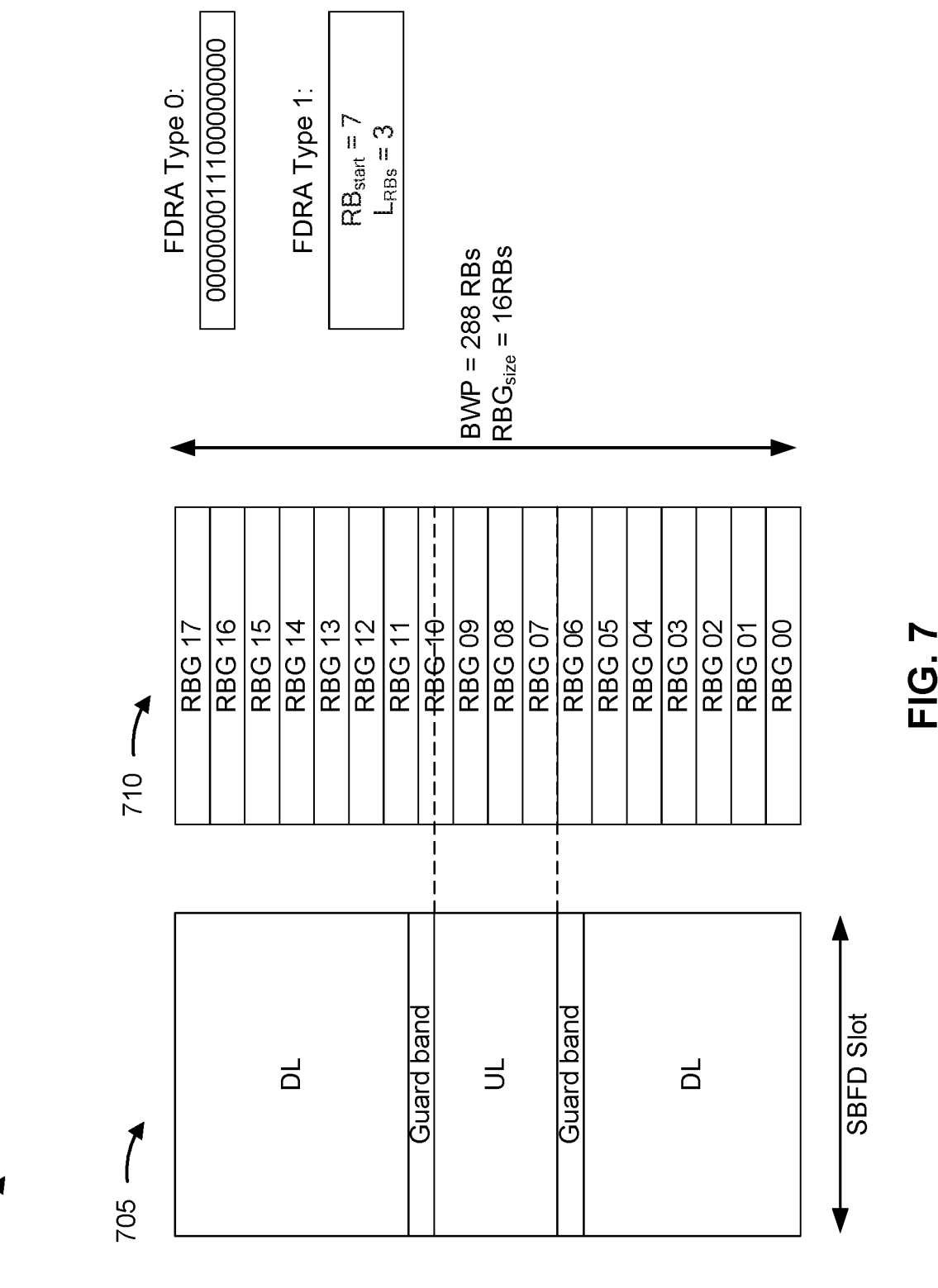
FIG. 7 is a diagram illustrating an example of sub-band full duplex (SBFD) FDRA, in accordance with the present disclosure.

FIG. 7 is a diagram illustrating an example 700 of SBFD frequency domain resource allocation (FDRA), in accordance with the present disclosure. In this example 700, an SBFD slot 705 is shown with a corresponding resource allocation 710 of RBGs. For example, the FDRA may be for RBGs 07, 08, and 09. A Type 0 FDRA may indicate the example FDRA with the bitmap "000000011100000000." A Type 1 FDRA may indicate the example FDRA with the MV "43" (e.g., 18 (3−1)+7)), given the BW size (e.g., in RBGs) of 18 RBGs. In this example, there are 16 RBs per RBG.

As indicated above, FIG. 7 is provided as an example. Other examples may differ from what is described with respect to FIG. 7.

The ability to communicate using different slot types (e.g., uplink slots, downlink slots, and/or SBFD slots, among other examples) provides flexibility in communications between network nodes and UEs. When communicating with different slot types, a network node may provide an FDRA based on the slot type. For example, for an uplink sub-band of an SBFD slot, the network node may provide DCI indicating the FDRA for the sub-band, and when switching to an uplink slot, the network node may provide another DCI indicating the FDRA for the uplink slot. However, the additional communications used to indicate the FDRA (e.g., DCI) for different slot types, and resources used to make FDRA determinations for different slot types, may result in networking and processing overhead for both the network node and the UE by consuming network and processing resources of the network node and/or UE. In some aspects, for a case of a single DCI scheduling multiple PUSCH and/or PDSCH across SBFD and non-SBFD slots, a single FDRA may be used that can be interpreted differently based on the slot type. In some aspects, PUSCH and/or PDSCH repetition across slot types may be performed, and a single DCI may schedule PDSCH and/or PUSCH (e.g., dynamically) or activated via semi-persistent scheduling and/or configured grant with repetition across multiple slots using a single FDRA bitmap. In these and other examples, the frequency resource of allocated PUSCH and/or PDSCH in the different slots types is different (e.g. start RB/RGB and resolutions of the allocation). In addition, the sizes of the RBGs in an FDRA may be based on a size of the BWP of the slot and may not take into account the size of a sub-band for an SBFD slot. This may lead to a sub-band using relatively large RBGs for a relatively small sub-band. This loss in granularity may cause RBs to be allocated for a UE in an SBFD slot because they are part of an RBG, even when those RBs are not within the sub-band being allocated. This may result in an inefficient allocation of RBs for a sub-band, when those RBs could be used for other purposes (e.g., scheduling).

Some techniques and apparatuses described herein enable resource allocation scaling for SBFD communications. For example, a network node may transmit, and a UE receive, an FDRA for a slot, indicated by a bitmap or MV. Using the MV or bitmap, the UE may identify allocated RBGs, and a size, starting point, and/or length of the RBGs may be based at least in part on whether the slot is an SBFD slot. In this way, the same bitmap or RIV may be used to indicate an FDRA for an SBFD slot and a non-SBFD slot. In some aspects, for an SBFD slot, the RBG size may be based at least in part on a BWP size of the slot, and a ratio of a size of the sub-band of the SBFD slot to the BWP size. As a result, the FDRA indicator (e.g., bitmap or RIV) may be scaled for SBFD slots, enabling more granular RBG sizes than would be allocated for the slot without scaling. Using the same FDRA indicator for multiple types of slots may reduce networking and processing overhead for both network nodes and UEs that communicate using multiple different types of slots. In addition, more granular RBG sizes that are scaled based on the sub-band size of an SBFD slot may lead to more efficient resource allocation.

20

Figure 8:
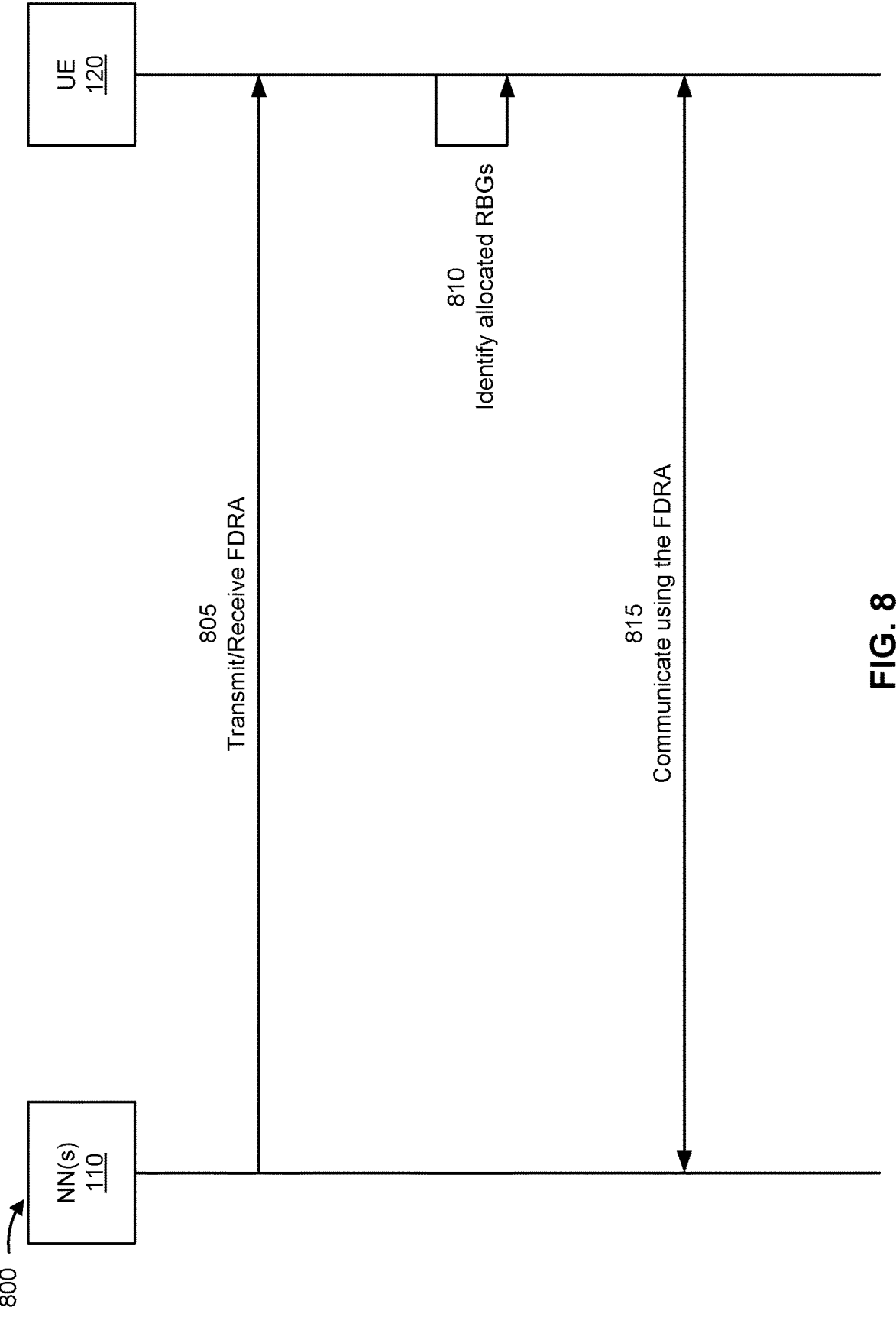
FIG. 8 is a diagram illustrating an example associated with resource allocation scaling for SBFD communications, in accordance with the present disclosure.

FIG. 8 is a diagram illustrating an example 800 associated with resource allocation scaling for SBFD communications, in accordance with the present disclosure. As shown in FIG. 8, a network node 110 and a UE 120 may communicate with one another. In some aspects, the network node and UE may have established communications prior to example 800. For example, the network node and UE may have established an access link, and the UE may be configured (e.g., by the network node) with the capability to scale FDRAs for SBFD communications. In some aspects, the UE may indicate, to the network node, that the UE is capable of scaling FDRAs for SBFD communications.

As shown by reference number 805, the network node may transmit, and the UE may receive, a communication indicating, via an RIV or a bitmap, an FDRA for at least one slot. For example, as described herein, the FDRA may be indicated via DCI, SPS, and/or CORESET. The FDRA may be for one slot or for multiple slots, and the slots may be of the same type or of different types. For example, the FDRA may be for any number of downlink slots, uplink slots, and/or SBFD slots. In some aspects, the FDRA may be for a physical uplink shared channel (PUSCH) communication or a physical downlink shared channel (PDSCH) communication allocated across one or more slots. In some aspects, the FDRA is for a multiple PUSCH or multiple PDSCH allocation across multiple slots using single DCI scheduling multiple transport blocks for the multiple PUSCH communications or the multiple PDSCH communications. In some aspects, the FDRA may be a one-way resource allocation. For example, the FDRA may be for uplink communications, allocating resources in uplink slots and in uplink sub-band(s) of SBFD slots. As another example, the FDRA may be for downlink communications, allocating resources in downlink slots and in downlink sub-band(s) of SBFD slots. As described herein, the communication may indicate the FDRA using a bitmap or an RIV. In some aspects, the network node may determine the FDRA (e.g., as described herein) before transmitting the communication indicating the FDRA.

As shown by reference number 810, the UE may identify, using the RIV or the bitmap, one or more allocated RBGs of a first slot. A size of each RBG may be based at least in part on whether the first slot is an SBFD slot. Additionally, or alternatively, a starting point and length of the first allocated RBGs may be based at least in part on whether the first slot is an SBFD slot. In some aspects, the RBG size may be determined based at least in part on an RRC configured a ratio, multiplier, or divisor.

In some aspects, if the FDRA indicator is a bitmap (e.g., Type 0 FDRA) and the slot is an SBFD slot, the size of each RBG may be based at least in part on a BWP size of the SBFD slot and a ratio of a sub-band size of the SBFD slot to the BWP size of the SBFD slot. For example, in a situation where an uplink sub-band is one half the size of the BWP, the size of each RBG may be one half the size of RBGs for a non-SBFD slot with the same BWP size. By way of example, for a non-SBFD slot with a BWP size between 145-275 RBs, RBGs may each include 16 RBs. Accordingly, for the SBFD slot where the sub-band is half the size of BWP, each RBG of the sub-band may include 8 RBs (e.g., ½ of 16). Similarly, for an SBFD slot where the sub-band is ¼ the size of the BWP, the RBGs for the sub-band may each include 4 RBs (e.g., ¼ of 16), and for an SBFD slot where the sub-band is ⅛ the size of the BWP, the RBGs for the sub-band may each include 2 RBs (e.g., ⅛ of 16). In some aspects, the RBG size for a sub-band of an SBFD slot may be determined by 1/k*RBG size of a non-SBFD slot, where the scaling factor k is a largest value k where $$k \leq \left\lfloor \frac{BWP \text{ size}}{\text{Sub-band size}} \right\rfloor.$$

In some aspects K is integer value of a power of two.

In some aspects, the bitmap indicates that a first resource allocation unit of a sub-band of the SBFD slot maps to a first available RB in the sub-band. For example, an RBG may include multiple RBs, and the sub-band may be separated (e.g., by guard bands) in a manner that splits the first and/or last RBG of the sub-band. By allocating the first available RB in the sub-band, the UE may use a partial RBG (e.g., the first RBG of the sub-band).

In some aspects, if the FDRA indicator is an RIV (e.g., Type 1 FDRA), and the slot is an SBFD slot, the starting point of the first allocated RBs and the length of the one or more first allocated RBs are based at least in part on a BWP size of the SBFD slot and a ratio of a sub-band size of the SBFD slot to the BWP size of the SBFD slot. Similar to Type 0 FDRA, as described herein, in a situation where an uplink sub-band is one half the size of the BWP, the starting point of the first allocated RB may be one half the starting point for a non-SBFD slot with the same BWP size. By way of example, using the scaling factor k, as described herein, where k=2, if a non-SBFD slot would be allocated 100 RBs starting at RB 20, the SBFD slot may be allocated 50 RBs (e.g., ½ of 100) and start at RB 10 (e.g., ½ of 20). Similarly, for an SBFD slot where the sub-band is ¼ the size of the BWP (e.g., k=4), the SBFD slot may be allocated 25 RBs (e.g., ¼ of 100) and start at RB 5 (e.g., ¼ of 20).

In some aspects, the FDRA indicator may be for multiple sub-bands of an SBFD slot. For example, an SBFD slot may include two downlink sub-bands separated from one another by an uplink sub-band and guard bands. When the FDRA indicator is a bitmap (e.g., Type 0 FDRA), the FDRA may be determined in the same manner as for one sub-band, as described herein. For example, because the bitmap provides a mapping to allocated RBGs, the uplink sub-band may be represented by 0s in the bitmap (e.g., a bitmap of 111111100000111111 indicates no allocation in a center of the BWP where an uplink sub-band may be located). In this example, each bit of the bitmap may indicate an allocation of one RBG. When the FDRA indicator is an RIV (e.g., Type 1 FDRA), the FDRA may be determined in the same manner as for one sub-band, as described herein, except that the sizes of the separate sub-bands are aggregated to determine the scaling factor k. For example, if a first sub-band is 40 RBs and a second sub-band is 60 RBs, the aggregate size of the sub-bands may be 100 RBs. In a situation where the full BWP of the slot is 272 RBs, the scaling factor k may be 2, and two separate RIVs may be used (e.g., one for each sub-band).

As shown by reference number 815, the network node and UE may communicate using the FDRA. For example, if the FDRA was for uplink communications, the UE may use the FDRA to transmit one or more uplink communications to the network node. If the FDRA was for downlink communications, the network node may transmit, and the UE may receive, one or more downlink communications using the resources allocated by the FDRA.

In some aspects, the same FDRA indicator may be used for different types of slots. For example, for an uplink or downlink slot, the RBs and RBGs indicated by the FDRA may be determined based on the BWP size of the slot, without the scaling factor k. For SBFD slots, the scaling factor k may be used. This enables the same FDRA indicator to be used across multiple different slot types without using separate FDRA indications for different slot types.

In this way, the same bitmap or RIV may be used to indicate an FDRA for an SBFD slot and a non-SBFD slot. In some aspects, for an SBFD slot, the RBG size may be based at least in part on a BWP size of the slot, and a ratio of a size of the sub-band of the SBFD slot to the BWP size. As a result, the FDRA indicator (e.g., bitmap or MV) may be scaled for SBFD slots, enabling more granular RBG sizes than would be allocated for the slot without scaling. Using the same FDRA indicator for multiple types of slots may reduce networking and processing overhead for both network nodes and UEs that communicate using multiple different types of slots. In addition, more granular RBG sizes that are scaled based on the sub-band size of an SBFD slot may lead to more efficient resource allocation.

As indicated above, FIG. 8 is provided as an example. Other examples may differ from what is described with respect to FIG. 8.

Figure 9A:
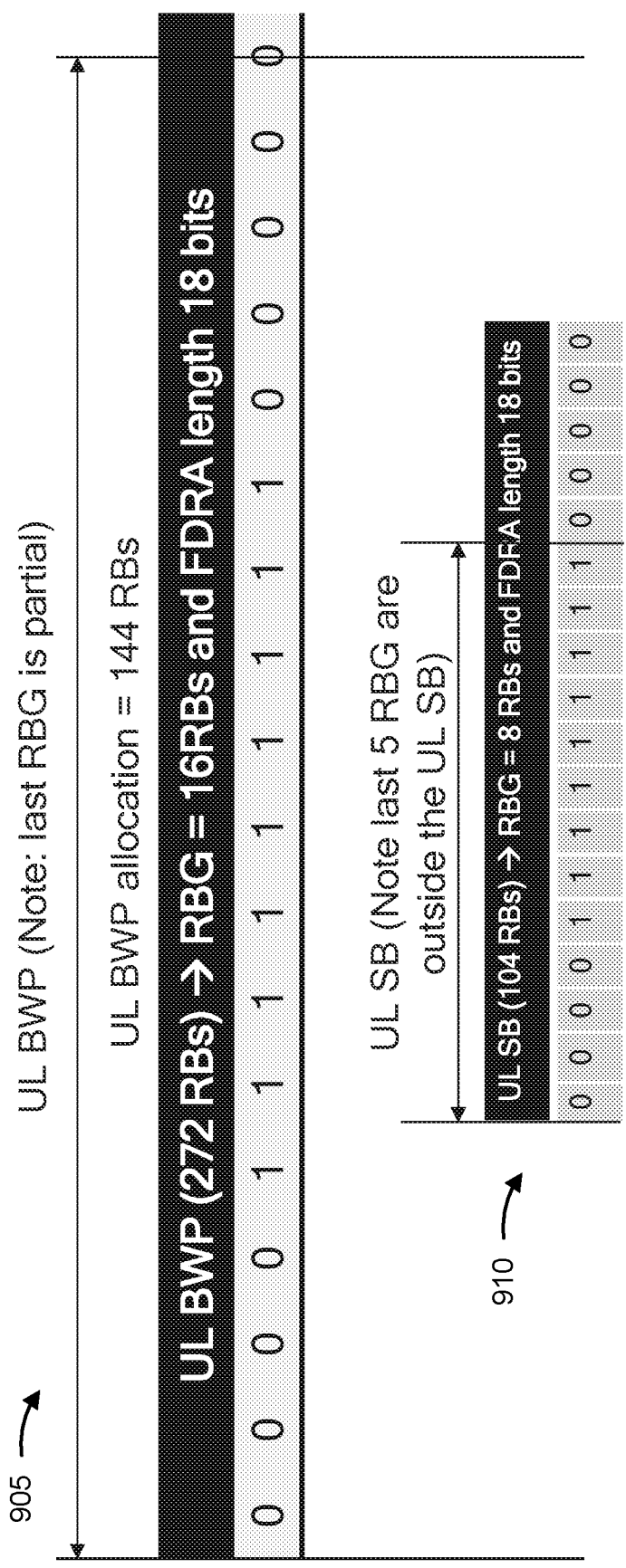
Figure 9B:
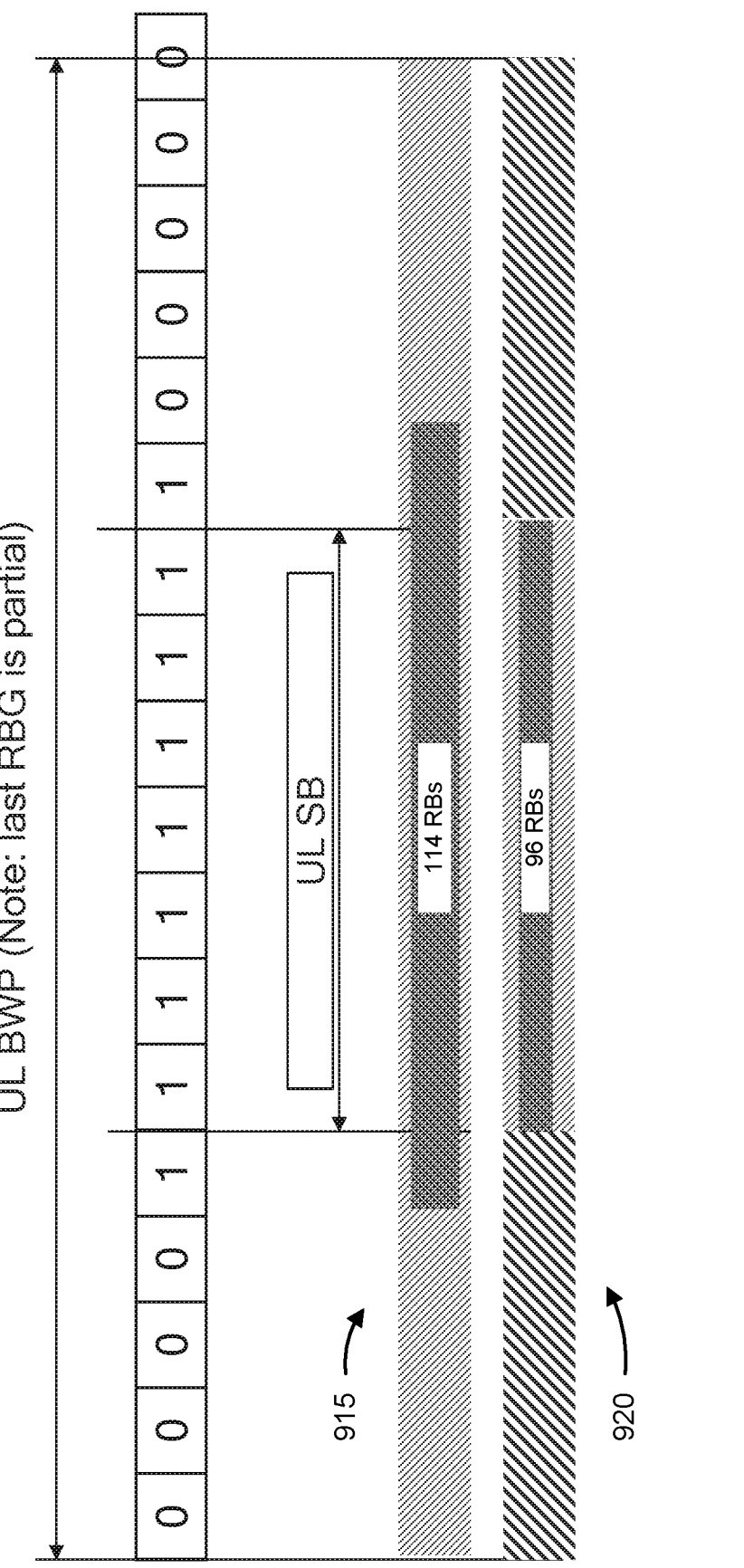

FIGS. 9A-9C are diagrams illustrating examples associated with FDRA for different slot types. In FIG. 9A, a Type 0 FDRA is shown, where the same bitmap (e.g., 000011111111100000) is interpreted differently for an uplink slot 905 and an uplink sub-band 910 for an SBFD slot. For example, the bitmap indicates 144 of 272 RBs allocated, having 16 RBs in each, and the length of the FDRA bitmap is 18 bits. The same 18-bit bitmap, when interpreted (e.g., by the UE) for the uplink sub-band 910, indicates 72 of 104 RBs allocated in 8 RB size RBGs.

In FIG. 9B, another Type 0 FDRA configuration is shown, in which the FDRA bitmap is interpreted to have the same RBG size for both an uplink slot 915 and uplink sub-band 920. In this situation, the scaling factor k may be 1, in which case the RBGs are not scaled for the SBFD slot. While the RBGs are the same size, the same bitmap may still be used for the FDRA for both slots by ignoring, for the SBFD slot, RBGs that exceed the size of the allocated sub-band. For example, the FDRA of the uplink slot 915 is 144 RBs and 96 RBs for the uplink sub-band 920. The RBGs outside the uplink sub-band 920 are treated as non-allocated, enabling the same bitmap to be used for the FDRA of both slots, even when the RBGs are not scaled.

In FIG. 9C, a Type 1 FDRA is shown with a multiplexing configuration, where the network node may indicate FDRAs for multiple UEs. For example, in an uplink slot 925, for a first UE, the RB start value may be 10 and the RB length value may be 20; for a second UE, the RB start value may be 30 and the RB length value may be 30. When scaled by a scaling factor k of 2 for the SBFD slot 930, the values are halved. For example, in the SBFD slot 930, for the first UE, the RB start value may be 5 and the RB length value may be 10; for the second UE, the RB start value may be 15 and the RB length value may be 15. As shown, the FDRA scaling described herein may work for multiplexed FDRAs in a manner similar to that of a single UE FDRA.

As indicated above, FIGS. 9A-9C are provided as examples. Other examples may differ from what is described with respect to FIGS. 9A-9C.

Figure 10:
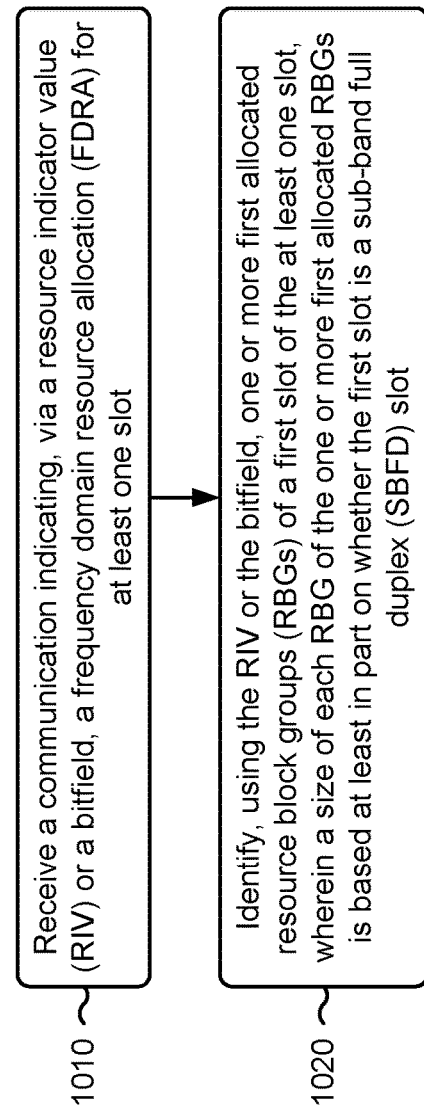

FIG. 10 is a diagram illustrating an example process 1000 performed, for example, by a UE, in accordance with the present disclosure. Example process 1000 is an example where the UE (e.g., UE 120) performs operations associated with resource allocation scaling for SBFD communications.

As shown in FIG. 10, in some aspects, process 1000 may include receiving a communication indicating, via an RIV or a bitmap, an FDRA for at least one slot (block 1010). For example, the UE (e.g., using communication manager 140 and/or reception component 1202, depicted in FIG. 12) may receive a communication indicating, via an RIV or a bitmap, an FDRA for at least one slot, as described above.

As further shown in FIG. 10, in some aspects, process 1000 may include identifying, using the RIV or the bitmap, one or more first allocated RBGs of a first slot of the at least one slot, wherein a size of each RBG of the one or more first allocated RBGs is based at least in part on whether the first slot is an SBFD slot (block 1020). For example, the UE (e.g., using communication manager 140 and/or identification component 1208, depicted in FIG. 12) may identify, using the RIV or the bitmap, one or more first allocated RBGs of a first slot of the at least one slot, wherein a size of each RBG of the one or more first allocated RBGs is based at least in part on whether the first slot is an SBFD slot, as described above.

Process 1000 may include additional aspects, such as any single aspect or any combination of aspects described below and/or in connection with one or more other processes described elsewhere herein.

In a first aspect, the size of each RBG of the one or more first allocated RBGs is further based at least in part on a BWP size of the first slot.

In a second aspect, alone or in combination with the first aspect, identifying the one or more first allocated RBGs further comprises identifying, using the RIV, a starting point and length of the one or more first allocated RBGs.

In a third aspect, alone or in combination with one or more of the first and second aspects, for a non-SBFD slot, the starting point of the one or more first allocated RBGs and the length of the one or more first allocated RBGs are based at least in part on the BWP size of the non-SBFD slot.

In a fourth aspect, alone or in combination with one or more of the first through third aspects, the first slot is an SBFD slot and the FDRA is for a sub-band of the first slot.

In a fifth aspect, alone or in combination with one or more of the first through fourth aspects, RBs outside a sub-band of the SBFD slot are unavailable for the FDRA.

In a sixth aspect, alone or in combination with one or more of the first through fifth aspects, for a non-SBFD slot, the size of each RBG is based at least in part on the BWP size of the non-SBFD slot.

In a seventh aspect, alone or in combination with one or more of the first through sixth aspects, the size of each RBG is measured by a number of resource blocks (RBs) included in each RBG.

In an eighth aspect, alone or in combination with one or more of the first through seventh aspects, process 1000 includes identifying, using the RIV or the bitmap, one or more second allocated RBGs of a second slot of the at least one slot.

In a ninth aspect, alone or in combination with one or more of the first through eighth aspects, the first slot is the SBFD slot and the second slot is a non-SBFD slot.

In a tenth aspect, alone or in combination with one or more of the first through ninth aspects, the bitmap indicates that a first resource allocation unit of a sub-band of the SBFD slot maps to a first available RB in the sub-band.

In an eleventh aspect, alone or in combination with one or more of the first through tenth aspects, the first slot is the SBFD slot, and the RIV or the bitmap indicates that the FDRA is for multiple sub-bands of the SBFD slot.

In a twelfth aspect, alone or in combination with one or more of the first through eleventh aspects, the multiple sub-bands are separated by at least one other sub-band.

In a thirteenth aspect, alone or in combination with one or more of the first through twelfth aspects, the FDRA is for at least one of a physical uplink shared channel communication or a physical downlink shared channel communication in the at least one slot.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a network node, in accordance with the present disclosure. Example process 1100 is an example where the network node (e.g., network node 110) performs operations associated with resource allocation scaling for SBFD communications.

As shown in FIG. 11, in some aspects, process 1100 may include determining an FDRA for at least one slot (block 1110). For example, the network node (e.g., using communication manager 150 and/or determination component 1308, depicted in FIG. 13) may determine an FDRA for at least one slot, as described above.

As shown in FIG. 11, in some aspects, process 1100 may include transmitting a communication indicating, via an RIV or a bitmap, an FDRA for at least one slot (block 1120). For example, the network node (e.g., using communication manager 150 and/or transmission component 1304, depicted in FIG. 13) may transmit a communication indicating, via an RIV or a bitmap, an FDRA for at least one slot, as described above.

Process 1100 may include additional aspects, such as any single aspect or any combination of aspects described below and/or in connection with one or more other processes described elsewhere herein.

In a first aspect, the size of each RBG is further based at least in part on a BWP size of the first slot.

In a second aspect, alone or in combination with the first aspect, the RIV indicates a starting point and length of the one or more first allocated RBGs.

In a third aspect, alone or in combination with one or more of the first and second aspects, for a non-SBFD slot, the starting point of the one or more first allocated RBGs and the length of the one or more first allocated RBGs are based at least in part on the BWP size of the non-SBFD slot.

In a fourth aspect, alone or in combination with one or more of the first through third aspects, the first slot is an SBFD slot and the FDRA is for a sub-band of the first slot.

In a fifth aspect, alone or in combination with one or more of the first through fourth aspects, RBs outside a sub-band of the SBFD slot are unavailable for the FDRA.

In a sixth aspect, alone or in combination with one or more of the first through fifth aspects, for a non-SBFD slot, the size of each RBG is based at least in part on the BWP size of the non-SBFD slot.

In a seventh aspect, alone or in combination with one or more of the first through sixth aspects, the size of each RBG is measured by a number of RBs included in each RBG.

In an eighth aspect, alone or in combination with one or more of the first through seventh aspects, the RIV or the bitmap further indicates one or more second allocated RBGs of a second slot of the at least one slot.

In a ninth aspect, alone or in combination with one or more of the first through eighth aspects, the first slot is the SBFD slot and the second slot is a non-SBFD slot.

In a tenth aspect, alone or in combination with one or more of the first through ninth aspects, the bitmap indicates that a first resource allocation unit of a sub-band of the SBFD slot maps to a first available RB in the sub-band.

In an eleventh aspect, alone or in combination with one or more of the first through tenth aspects, the first slot is the SBFD slot, and the RIV or the bitmap indicates that the FDRA is for multiple sub-bands of the SBFD slot.

In a twelfth aspect, alone or in combination with one or more of the first through eleventh aspects, the multiple sub-bands are separated by at least one other sub-band.

In a thirteenth aspect, alone or in combination with one or more of the first through twelfth aspects, the FDRA is for at least one of a physical uplink shared channel communication or a physical downlink shared channel communication in the at least one slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
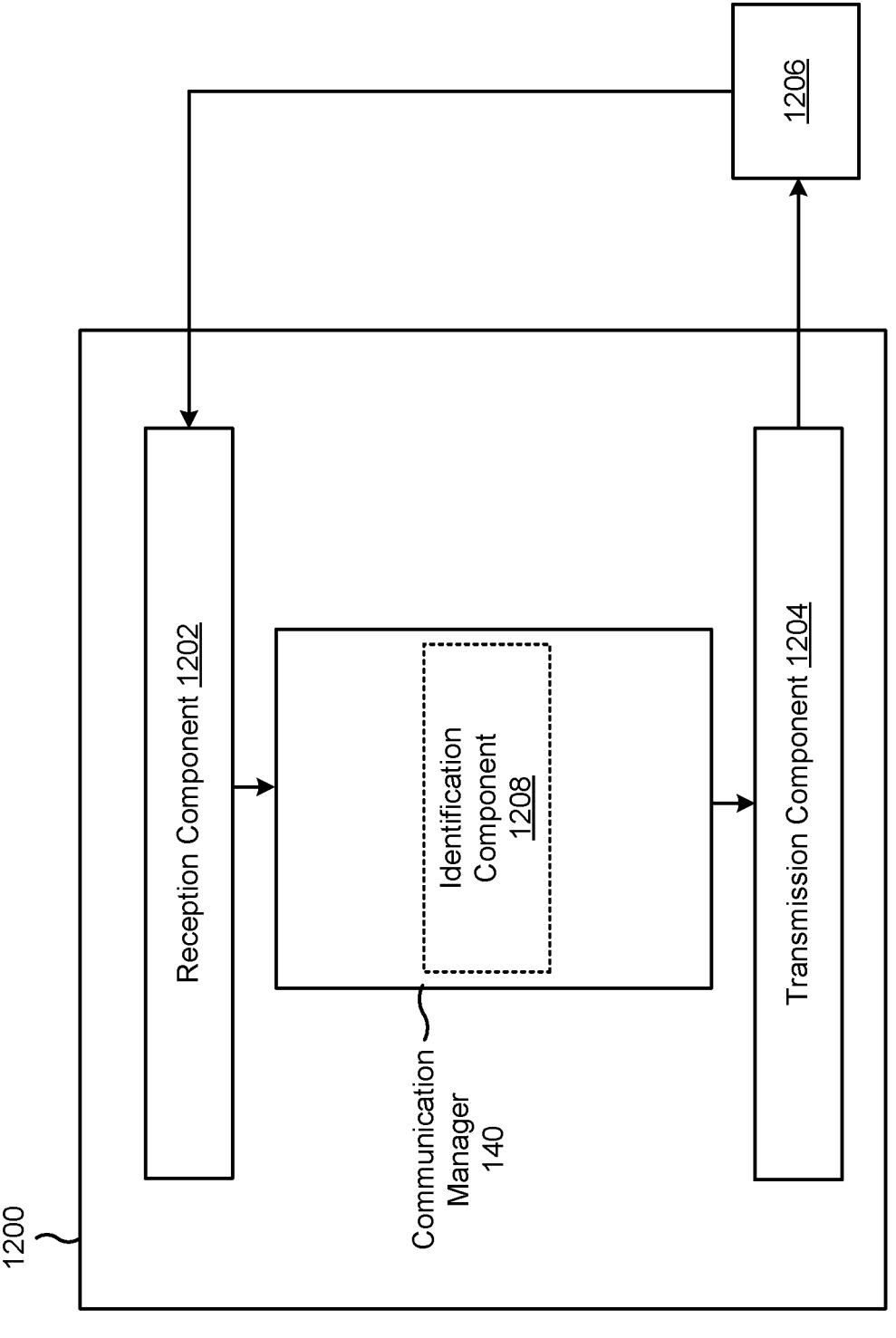
FIGS. 12 and 13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include an identification component 1208, among other examples.

In some aspects, the apparatus 1200 may be configured to perform one or more operations described herein in connection with FIGS. 4-9C. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a communication indicating, via an RIV or a bitmap, an FDRA for at least one slot. The identification component 1208 may identify, using the RIV or the bitmap, one or more first allocated RBGs of a first slot of the at least one slot, wherein a size of each RBG of the one or more first allocated RBGs is based at least in part on whether the first slot is an SBFD slot.

The identification component 1208 may identify, using the RIV or the bitmap, one or more second allocated RBGs of a second slot of the at least one slot.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
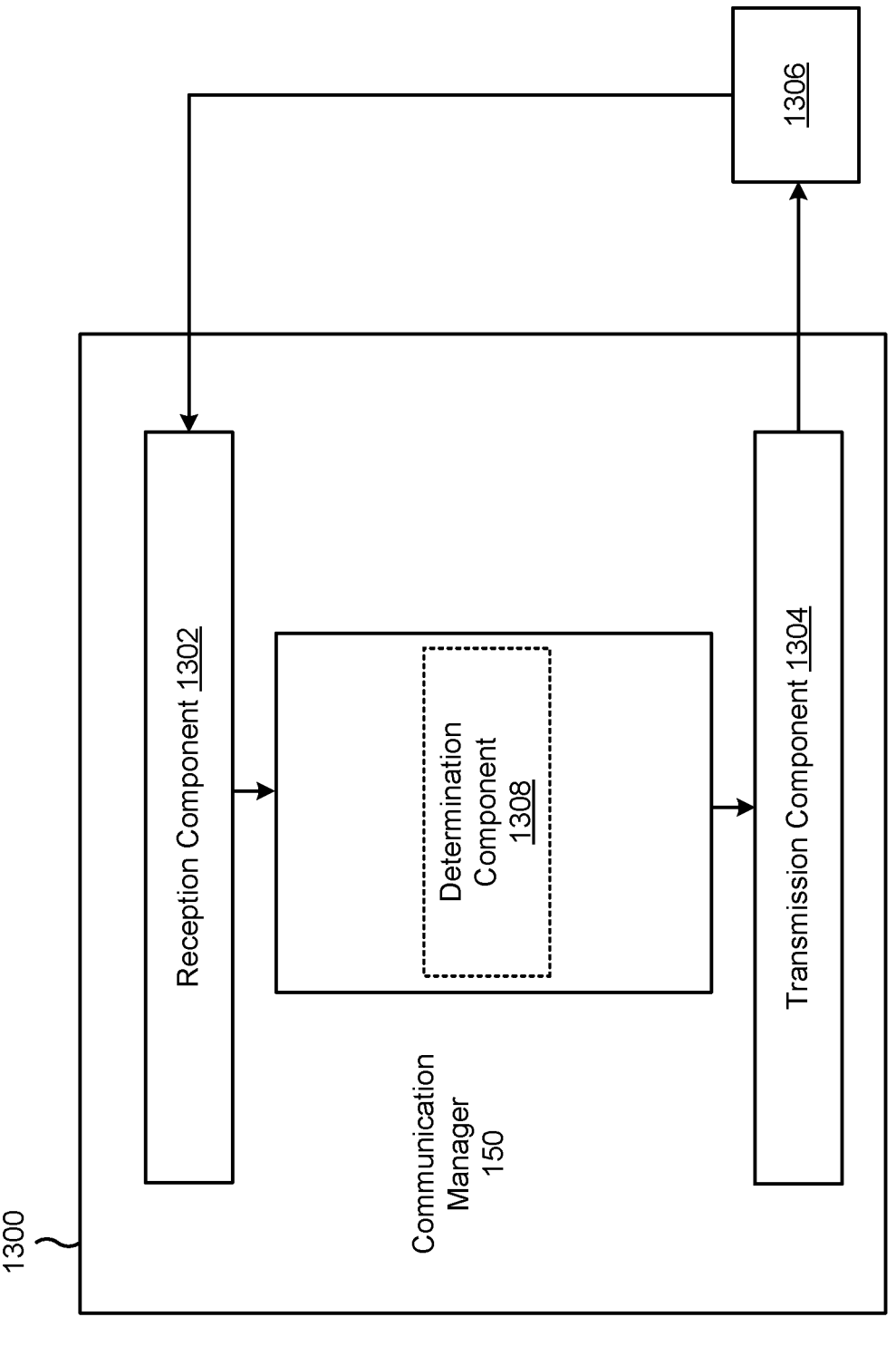

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include one or more other components, such as a determination component 1308, among other examples.

In some aspects, the apparatus 1300 may be configured to perform one or more operations described herein in connection with FIGS. 4-9C. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The determination component 1304 may determine an FDRA for at least one slot.

The transmission component 1304 may transmit a communication indicating, via an RIV or a bitmap, the FDRA for the at least one slot.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by an apparatus of a UE, comprising: receiving a communication indicating, via an RIV or a bitmap, an FDRA for at least one slot; and identifying, using the RIV or the bitmap, one or more first allocated RBGs of a first slot of the at least one slot, wherein a size of each RBG of the one or more first allocated RBGs is based at least in part on whether the first slot is an SBFD slot.

Aspect 2: The method of Aspect 1, wherein the size of each RBG of the one or more first allocated RBGs is further based at least in part on a BWP size of the first slot.

Aspect 3: The method of any of Aspects 1-2, wherein identifying the one or more first allocated RBGs further comprises: identifying, using the RIV, a starting point and length of the one or more first allocated RBGs.

Aspect 4: The method of Aspect 3, wherein, for the SBFD slot, the starting point of the one or more first allocated RBGs and the length of the one or more first allocated RBGs are based at least in part on a BWP size of the SBFD slot and a ratio of a sub-band size of the SBFD slot to the BWP size of the SBFD slot, and wherein, for a non-SBFD slot, the starting point of the one or more first allocated RBGs and the length of the one or more first allocated RBGs are based at least in part on the BWP size of the non-SBFD slot.

Aspect 5: The method of any of Aspects 1-4, wherein the first slot is an SBFD slot and the FDRA is for a sub-band of the first slot.

Aspect 6: The method of Aspect 5, wherein RBs outside a sub-band of the SBFD slot are unavailable for the FDRA.

Aspect 7: The method of any of Aspects 1-6, wherein, for the SBFD slot, the size of each RBG is based at least in part on a BWP size of the SBFD slot and a ratio of a sub-band size of the SBFD slot to the BWP size of the SBFD slot; and wherein, for a non-SBFD slot, the size of each RBG is based at least in part on the BWP size of the non-SBFD slot.

Aspect 8: The method of any of Aspects 1-7, wherein the size of each RBG is measured by a number of RBs included in each RBG.

Aspect 9: The method of any of Aspects 1-8, further comprising: identifying, using the RIV or the bitmap, one or more second allocated RBGs of a second slot of the at least one slot.

Aspect 10: The method of Aspect 9, wherein the first slot is the SBFD slot and the second slot is a non-SBFD slot.

Aspect 11: The method of any of Aspects 1-10, wherein the bitmap indicates that a first resource allocation unit of a sub-band of the SBFD slot maps to a first available RB in the sub-band.

Aspect 12: The method of any of Aspects 1-11, wherein the first slot is the SBFD slot, and wherein the RIV or the bitmap indicates that the FDRA is for multiple sub-bands of the SBFD slot.

Aspect 13: The method of Aspect 12, wherein the multiple sub-bands are separated by at least one other sub-band.

Aspect 14: The method of any of Aspects 1-13, wherein the FDRA is for at least one of a physical uplink shared channel communication or a physical downlink shared channel communication in the at least one slot.

Aspect 15: A method of wireless communication performed by an apparatus of a network node, comprising: determining an FDRA for at least one slot; and transmitting a communication indicating, via an RIV or a bitmap, the FDRA for the at least one slot, wherein the RIV or the bitmap indicates one or more first allocated RBGs of a first slot of the at least one slot, wherein a size of each RBG of the one or more first allocated RBGs is based at least in part on whether the first slot is an SBFD slot.

Aspect 16: The method of Aspect 15, wherein the size of each RBG of the one or more first allocated RBGs is further based at least in part on a BWP size of the first slot.

Aspect 17: The method of any of Aspects 15-16, wherein the RIV indicates a starting point and length of the one or more first allocated RBGs.

Aspect 18: The method of Aspect 17, wherein, for the SBFD slot, the starting point of the one or more first allocated RBGs and the length of the one or more first allocated RBGs are based at least in part on a BWP size of the SBFD slot and a ratio of a sub-band size of the SBFD slot to the BWP size of the SBFD slot, and wherein, for a non-SBFD slot, the starting point of the one or more first allocated RBGs and the length of the one or more first allocated RBGs are based at least in part on the BWP size of the non-SBFD slot.

Aspect 19: The method of any of Aspects 15-18, wherein the first slot is an SBFD slot and the FDRA is for a sub-band of the first slot.

Aspect 20: The method of Aspect 19, wherein RBs outside a sub-band of the SBFD slot are unavailable for the FDRA.

Aspect 21: The method of any of Aspects 15-20, wherein, for the SBFD slot, the size of each RBG is based at least in part on a BWP size of the SBFD slot and a ratio of a sub-band size of the SBFD slot to the BWP size of the SBFD slot; and wherein, for a non-SBFD slot, the size of each RBG is based at least in part on the BWP size of the non-SBFD slot.

Aspect 22: The method of any of Aspects 15-21, wherein the size of each RBG is measured by a number of RBs included in each RBG.

Aspect 23: The method of any of Aspects 15-22, wherein the RIV of the bitmap further indicates one or more second allocated RBGs of a second slot of the at least one slot.

Aspect 24: The method of Aspect 23, wherein the first slot is the SBFD slot and the second slot is a non-SBFD slot.

Aspect 25: The method of any of Aspects 15-24, wherein the bitmap indicates that a first resource allocation unit of a sub-band of the SBFD slot maps to a first available RB in the sub-band.

Aspect 2265: The method of any of Aspects 15-25, wherein the first slot is the SBFD slot, and wherein the RIV or the bitmap indicates that the FDRA is for multiple sub-bands of the SBFD slot.

Aspect 27: The method of Aspect 26, wherein the multiple sub-bands are separated by at least one other sub-band.

Aspect 28: The method of any of Aspects 14-27, wherein the FDRA is for at least one of a physical uplink shared channel communication or a physical downlink shared channel communication in the at least one slot.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: An apparatus for wireless communication at a device, comprising a processor; memory coupled with the processor; and instructions stored in the memory and executable by the processor to cause the apparatus to perform the method of one or more of Aspects 15-27.

Aspect 31: A device for wireless communication, comprising a memory and one or more processors coupled to the memory, the one or more processors configured to perform the method of one or more of Aspects 1-14.

Aspect 32: A device for wireless communication, comprising a memory and one or more processors coupled to the memory, the one or more processors configured to perform the method of one or more of Aspects 15-27.

Aspect 3: An apparatus for wireless communication, comprising at least one means for performing the method of one or more of Aspects 1-14.

Aspect 34: An apparatus for wireless communication, comprising at least one means for performing the method of one or more of Aspects 15-27.

Aspect 35: A non-transitory computer-readable medium storing code for wireless communication, the code comprising instructions executable by a processor to perform the method of one or more of Aspects 1-14.

Aspect 36: A non-transitory computer-readable medium storing code for wireless communication, the code comprising instructions executable by a processor to perform the method of one or more of Aspects 15-27.

Aspect 7: A non-transitory computer-readable medium storing a set of instructions for wireless communication, the set of instructions comprising one or more instructions that, when executed by one or more processors of a device, cause the device to perform the method of one or more of Aspects 1-14.

Aspect 38: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

receive a communication indicating, via a resource indicator value (RIV) or a bitmap, a frequency domain resource allocation (FDRA) for at least one slot; and identify, using the RIV or the bitmap, one or more first allocated resource block groups (RBGs) of a first slot of the at least one slot, wherein a size of each RBG of the one or more first allocated RBGs is based at least in part on whether the first slot is a sub-band full duplex (SBFD) slot and wherein the size of each RBG of the one or more first allocated RBGs is based at least in part on an RBG size of a non-SBFD slot and a ratio of a sub-band size of the first slot to a bandwidth part (BWP) size of the first slot.

2. The UE of claim 1, wherein the one or more processors, to identify the one or more first allocated RBGs, are configured to:

identify, using the RIV, a starting point and length of the one or more first allocated RBGs.

3. The UE of claim 2, wherein, for the SBFD slot, the starting point of the one or more first allocated RBGs and the length of the one or more first allocated RBGs are based at least in part on a BWP size of the SBFD slot and a ratio of a sub-band size of the SBFD slot to the BWP size of the SBFD slot, and wherein, for the non-SBFD slot, the starting point of the one or more first allocated RBGs and the length of the one or more first allocated RBGs are based at least in part on the BWP size of the non-SBFD slot.

4. The UE of claim 1, wherein the first slot is an SBFD slot and the FDRA is for a sub-band of the first slot.

5. The UE of claim 4, wherein resource blocks (RBs) outside a sub-band of the SBFD slot are unavailable for the FDRA.

6. The UE of claim 1, wherein each bit of the bitmap indicates an allocation of one RBG;

wherein, for the SBFD slot, the size of each RBG is based at least in part on a BWP size of the SBFD slot and a ratio of a sub-band size of the SBFD slot to the BWP size of the SBFD slot; and wherein, for a non-SBFD slot, the size of each RBG is based at least in part on the BWP size of the non-SBFD slot.

7. The UE of claim 1, wherein the size of each RBG is measured by a number of resource blocks (RBs) included in each RBG.

8. The UE of claim 1, wherein the one or more processors are further configured to:

identify, using the RIV or the bitmap, one or more second allocated RBGs of a second slot of the at least one slot.

9. The UE of claim 8, wherein the first slot is the SBFD slot and the second slot is a non-SBFD slot.

10. The UE of claim 1, wherein the bitmap indicates that a first resource allocation unit of a sub-band of the SBFD slot maps to a first available resource block (RB) in the sub-band.

11. The UE of claim 1, wherein the first slot is the SBFD slot, and wherein the RIV or the bitmap indicates that the FDRA is for multiple sub-bands of the SBFD slot.

12. The UE of claim 11, wherein the multiple sub-bands are separated by at least one other sub-band.

13. The UE of claim 1, wherein the FDRA is for at least one of a physical uplink shared channel communication or a physical downlink shared channel communication in the at least one slot.

14. A network node for wireless communication, comprising:

one or more memories; and one or more processors, coupled to the one or more memories, configured to:

determine a frequency domain resource allocation (FDRA) for at least one slot; and transmit a communication indicating, via a resource indicator value (RIV) or a bitmap, the FDRA for the at least one slot, wherein the RIV or the bitmap indicates one or more first allocated resource block groups (RBGs) of a first slot of the at least one slot, and wherein a size of each RBG of the one or more first allocated RBGs is based at least in part on whether the first slot is a sub-band full duplex (SBFD) slot and wherein the size of each RBG of the one or more first allocated RBGs is based at least in part on an RBG size of a non-SBFD slot and a ratio of a sub-band size of the first slot to a bandwidth part (BWP) size of the first slot.

15. The network node of claim 14, wherein the RIV indicates a starting point and length of the one or more first allocated RBGs.

16. The network node of claim 15, wherein, for the SBFD slot, the starting point of the one or more first allocated RBGs and the length of the one or more first allocated RBGs are based at least in part on a BWP size of the SBFD slot and a ratio of a sub-band size of the SBFD slot to the BWP size of the SBFD slot, and wherein, for a non-SBFD slot, the starting point of the one or more first allocated RBGs and the length of the one or more first allocated RBGs are based at least in part on the BWP size of the non-SBFD slot.

17. The network node of claim 14, wherein the first slot is an SBFD slot and the FDRA is for a sub-band of the first slot.

18. The network node of claim 17, wherein resource blocks (RBs) outside a sub-band of the SBFD slot are unavailable for the FDRA.

19. The network node of claim 14, wherein each bit of the bitmap indicates an allocation of one RBG;

wherein, for the SBFD slot, the size of each RBG is based at least in part on a BWP size of the SBFD slot and a ratio of a sub-band size of the SBFD slot to the BWP size of the SBFD slot; and wherein, for a non-SBFD slot, the size of each RBG is based at least in part on the BWP size of the non-SBFD slot.

20. The network node of claim 14, wherein the size of each RBG is measured by a number of resource blocks (RBs) included in each RBG.

21. The network node of claim 14, wherein the RIV or the bitmap further indicates one or more second allocated RBGs of a second slot of the at least one slot.

22. The network node of claim 21, wherein the first slot is the SBFD slot and the second slot is a non-SBFD slot.

23. The network node of claim 14, wherein the bitmap indicates that a first resource allocation unit of a sub-band of the SBFD slot maps to a first available resource block (RB) in the sub-band.

24. The network node of claim 14, wherein the first slot is the SBFD slot, and wherein the RIV or the bitmap indicates that the FDRA is for multiple sub-bands of the SBFD slot.

25. A method of wireless communication performed by an apparatus of a user equipment (UE), comprising:

receiving a communication indicating, via a resource indicator value (RIV) or a bitmap, a frequency domain resource allocation (FDRA) for at least one slot; and identifying, using the RIV or the bitmap, one or more first allocated resource block groups (RBGs) of a first slot of the at least one slot, wherein a size of each RBG of the one or more first allocated RBGs is based at least in part on whether the first slot is a sub-band full duplex (SBFD) slot and wherein the size of each RBG of the one or more first allocated RBGs is based at least in part on an RBG size of a non-SBFD slot and a ratio of a sub-band size of the first slot to a bandwidth part (BWP) size of the first slot.

26. The method of claim 25, wherein identifying the one or more first allocated RBGs further comprises:

identifying, using the RIV, a starting point and length of the one or more first allocated RBGs, and wherein, for the SBFD slot, the starting point of the one or more first allocated RBGs and the length of the one or more first allocated RBGs are based at least in part on a BWP size of the SBFD slot and a ratio of a sub-band size of the SBFD slot to the BWP size of the SBFD slot, and wherein, for a non-SBFD slot, the starting point of the one or more first allocated RBGs and the length of the one or more first allocated RBGs are based at least in part on the BWP size of the non-SBFD slot.

27. A method of wireless communication performed by a network node, comprising:

determining a frequency domain resource allocation (FDRA) for at least one slot; and transmitting a communication indicating, via a resource indicator value (RIV) or a bitmap, the FDRA for the at least one slot, wherein the RIV or the bitmap indicates one or more first allocated resource block groups (RBGs) of a first slot of the at least one slot, wherein a size of each RBG of the one or more first allocated RBGs is based at least in part on whether the first slot is a sub-band full duplex (SBFD) slot and wherein the size of each RBG of the one or more first allocated RBGs is based at least in part on an RBG size of a non-SBFD slot and a ratio of a sub-band size of the first slot to a bandwidth part (BWP) size of the first slot.

28. The method of claim 27, wherein, for the SBFD slot, the size of each RBG is based at least in part on BWP size of the SBFD slot and a ratio of a sub-band size of the SBFD slot to the BWP size of the SBFD slot; and wherein, for a non-SBFD slot, the size of each RBG is based at least in part on the BWP size of the non-SBFD slot.

29. The method of claim 27, wherein the first slot is an SBFD slot and the FDRA is for a sub-band of the first slot.

30. The method of claim 29, wherein resource blocks (RBs) outside a sub-band of the SBFD slot are unavailable for the FDRA.

*   *   *   *   *